Nov. 14, 1944.    F. M. BOWERS    2,362,610
HELMET CONNECTION FOR SKULLGUARDS
Filed Aug. 20, 1942
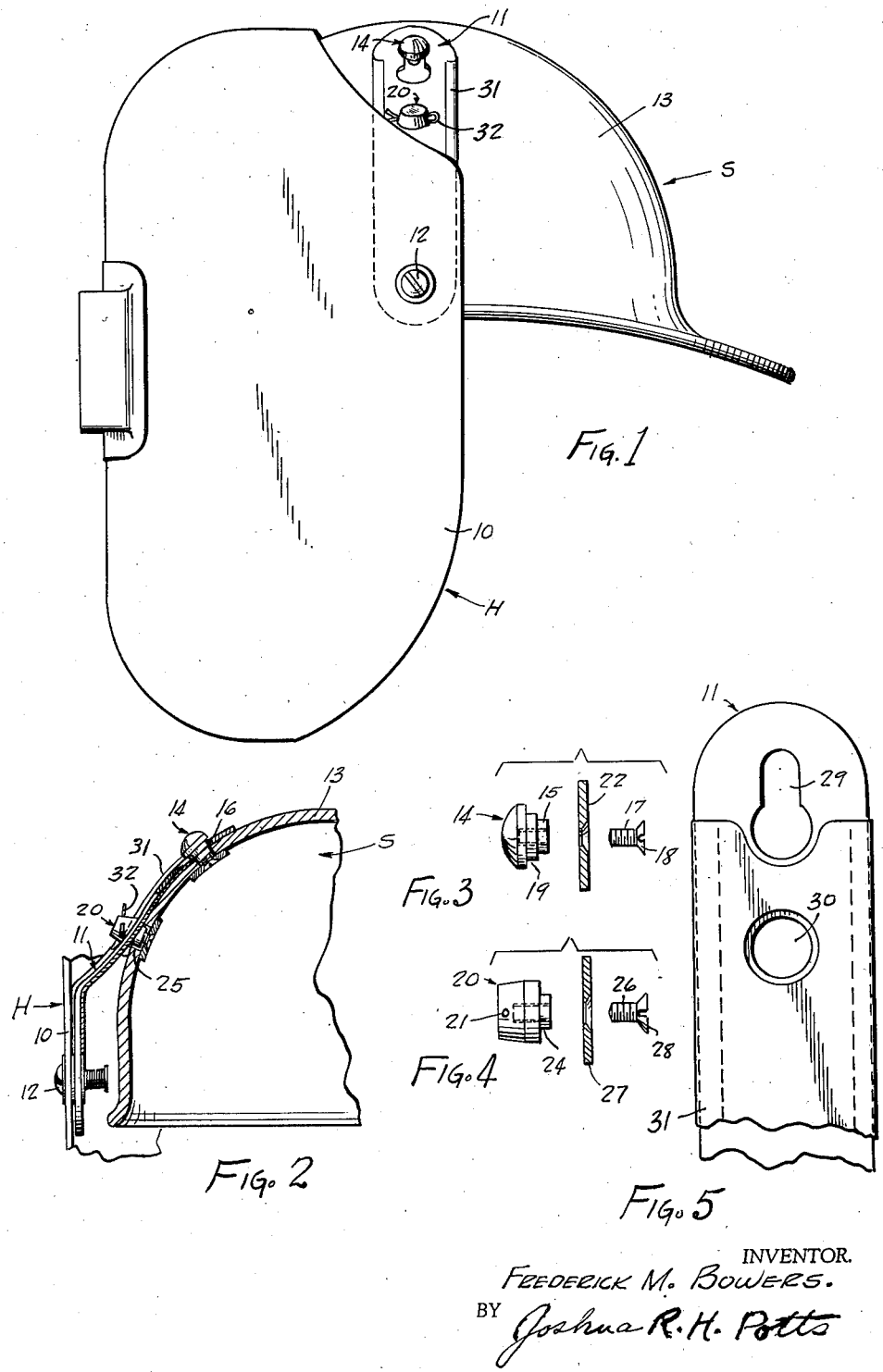
INVENTOR.
FREDERICK M. BOWERS.
BY Joshua R. H. Potts Patented Nov. 14, 1944

2,362,610

UNITED STATES PATENT OFFICE 2,362,610

HELMET CONNECTION FOR SKULLGUARDS

Frederick M. Bowers, Chester, Pa.

Application August 20, 1942, Serial No. 455,454

5 Claims. (Cl. 2—8)

This invention relates to welding helmets or masks and is concerned primarily with the detachable connection provided for mounting such a helmet on a skullguard or other headgear.

At the present time the use of safety hats known as "skullguards" is becoming more and more widespread throughout the industrial arts. Not only are these skullguards kept available for the safety of the workers as a matter of policy by the employer, but in many states their use is required by those regulations providing for the safety and welfare of the workers.

While such skullguards are generally required to be continuously worn by the worker around certain dangerous enterprises, the occasions when an additional protective device such as a welding helmet must be worn are more or less intermittent and occur only at intervals. It is, therefore, desirable that provision be made for detachably mounting a welding helmet on a skullguard and at the same time it is importantt hat the connection between the two be firm and secure to provide the proper anchorage for the helmet.

In the patent to F. M. Bowers 2,167,969, there is disclosed a connection arrangement for detachably mounting a welding helmet either on a skullguard or a "skeleton" headgear. The principal object of this invention is to provide an improved connection of this same general type.

More in detail, the invention has as an object the provision of a detachable connection of the character above noted which comprises extensions on a welding helmet and which extensions are formed with openings designed to cooperate with complemental fastening elements carried by a skullguard. In accordance with this invention each extension is provided with a keyhole slot which is adapted to cooperate with a headed button carried on the skullguard.

An important object is the provision of means for maintaining the neck of the button in the small part of the keyhole slot. This end is attained by forming an aperture in each extension in spaced relation to the keyhole slot. A pilot stud is provided on the skullguard and is adapted to be received in the aperture to prevent relative movement between the helmet extension and the skullguard.

Still a further object is the provision of means for preventing withdrawal of the stud from its aperture. This may be accomplished by using a cotter pin in a well-known manner.

Various other more detailed objects and advantages will in part become apparent and in part be hereinafter stated as the description of the invention proceeds.

The invention, therefore, comprises a novel and improved detachable connection between a welding helmet or mask and a skullguard. This connection consists of a pair of extensions pivotally carried by the helmet. Each extension is formed with a keyhole slot and an aperture spaced therefrom. The neck of a headed button is fitted within the small part of the keyhole slot in a well-known manner and the reception of a pilot stud in the aperture prevents the headed button from moving in the slot. A cotter pin prevents withdrawal of the stud from the aperture.

For a full and more complete understanding of the invention, reference may be had to the following description and accompanying drawing, wherein:

Fig. 1 is a view in side elevation of a welding helmet mounted on a skullguard by the detachable connection of this invention;

Fig. 2 is an enlarged detailed sectional view through the connection;

Fig. 3 is a view, partly in section and partly in elevation, showing the several elements of the headed button in exploded relation;

Fig. 4 is a similar showing of the parts of the pilot stud in exploded relation; and Fig. 5 is a detailed bottom plan of one end of one helmet extension.

Referring now to the drawing, wherein like reference characters denote corresponding parts, and first more particularly to Fig. 1, a welding mask is referred to in its entirety by the reference character H. This mask H includes a mask 10 of the usual fibre composition and the mask 10 is pivotally mounted on and between a pair of extensions 11. The pivot is shown at 12.

A skullguard is represented at S. This skullguard includes a hard outer shell 13, which may be made from any appropriate material having required properties of hardness, rigidity, strength, etc.

Provision is made at each side of the shell 13 for detachably yet firmly, anchoring one of the extensions 11 thereat. Thus a headed button 14 is affixed to the shell 13 by having its shank 15 pass through an opening 16 in the shell 13. A screw 17 is threaded into a bore in the shank 15 and has its head 18 countersunk in the inner face of a washer 22 that engages the inner face of the shell 13. It is notable that the head of the button 14 is spaced from the outer surface of the shell 13 by a neck 19. While the button 14 may be made from any suitable material a fibre composition is preferred as it is more readily obtainable and has proven to be satisfactory.

A pilot stud 20 of a truncated conical formation is also preferably of a fibrous material and is shown as formed with a transverse opening 21. This stud 20 has a shank 24 that is received in an opening 25 in the shell 13. A screw 26 passes through the opening of a washer 27, and is threaded into a bore in the shank 24. The head 28 of the screw 26 is also countersunk in the washer 27.

Each of the extensions 11 is formed with a keyhole slot 29 an an aperture 30. From its very nature the keyhole slot 29 has a narrower portion and enlarged part. The head of the button 14 is designed to pass through the enlarged part of the keyhole slot 29 while the neck 19 is snugly slidable into the narrower portion of the slot.

It is evident that the presence of the button 14 in the keyhole slot 29 prevents rotation of each extension 11 about the pilot stud 20 and conversely the reception of this stud 20 in the aperture 30 prevents rotation of the extension about the button as an axis.

The extensions 11 are preferably made of the same fibrous material employed in the manufacture of the mask 10. A metallic casing 31 of thin sheet metal may partially cover the inner face of each extension to render it more rigid and sturdy and to facilitate the sliding action incidental to making or breaking each connection.

In establishing the connection between each extension 11 and the skullguard S, the head of the button 14 is first passed through the enlarged part of the keyhole slot 29. The neck 19 is then moved along the narrower part of the keyhole slot until the pilot stud 20 aligns with the opening 30. The extension 11 is then moved into full face to face engagement with the outer surface of the shell 13, the stud 20 being received in the aperture 30. In this position any relative sliding movement between the extension 11 and shell 13 is positively precluded and the neck 19 of the button is kept in the narrower part of the keyhole slot 29.

A cotter pin 32 is now passed through the opening 21 and the parts of its bifurcated end spread. This cotter pin 32 prevents withdrawal of the stud 21 from the aperture 30. Thus the assembly providing the firm anchorage for the extension 11 on the shell 13 is maintained.

While a preferred specific embodiment of the invention is hereinbefore set forth, it is to be clearly understood that the invention is not to be limited to the exact constructions illustrated and described because various modifications of these details may be provided in putting the invention into practice within the purview of the appended claims.

What is claimed is:

1. A detachable connection for mounting a welding mask on a skullguard, said connection comprising an extension on said mask and formed with a keyhole slot and an aperture in spaced relation, said skullguard including an outer shell, a headed button on said shell and adapted for cooperation with said keyhole slot, and a pilot stud carried by said shell and corresponding in size and shape to said aperture whereby it is adapted to be snugly fitted in said aperture and be completely encircled thereby to prevent any relative sliding movement between said extension and said skullguard.

2. A detachable connection for mounting a welding mask on a skullguard, said connection comprising an extension pivotally attached to said mask, said extension being formed with a keyhole slot and an aperture in spaced relation, said skullguard including a hard outer shell, a headed button carried by said shell and adapted to cooperate with said keyhole slot, a pilot stud complemental to and received in said aperture and carried by said shell, said pilot stud being of substantially the same size and shape as said aperture, and means to prevent withdrawal of said stud from said aperture.

3. In a detachable connection for mounting a protective device on a headgear, an extension included as a part of said protective device and formed with a keyhole slot and an aperture in spaced relation, a button carried by said headgear and cooperable with said keyhole slot, and a pilot stud complemental to and received in said aperture and carried by said headgear, said pilot stud being of substantially the same size and shape as said aperture.

4. In a detachable connection for mounting a protective device on a headgear, an extension included as a part of said protective device and formed with a keyhole slot and an aperture in spaced relation, a button carried by said headgear and cooperable with said keyhole slot, a pilot stud carried by said headgear and formed with a transverse opening, said stud being adapted to be received in said aperture when said button is in the narrow portion of said keyhole slot, and a cotter pin in said transverse opening for preventing withdrawal of said stud from said aperture.

5. In a detachable connection between a welding mask and a skullguard, an extension pivotally attached to said mask and formed with a keyhole slot, said extension also having an aperture spaced from said slot, a hard outer shell included as a part of said skullguard, a headed button having a neck and carried by said shell, the head of said button being adapted to pass through the enlarged part of said keyhole slot while said neck is adapted to be snugly received in the narrower portion of said slot, a pilot stud also carried by said shell and adapted to be snugly fitted in said aperture when the neck of said button is in the narrow portion of said keyhole slot to maintain a desired relation of said button and keyhole slot, and a cotter pin in said stud to maintain said stud assembled in said aperture.

FREDERICK M. BOWERS.